(12) United States Patent
Oh et al.

(10) Patent No.: US 11,374,244 B2
(45) Date of Patent: Jun. 28, 2022

(54) APPARATUS AND METHOD FOR MEASURING VOLTAGE AND AVERAGE POWER OF FUEL CELL

(71) Applicant: HYUNDAI MOBIS CO., LTD., Seoul (KR)

(72) Inventors: Jung-Hwan Oh, Siheung-si (KR); Seulkirom Kim, Seoul (KR); Su-Hun Yang, Seoul (KR); Yeong-Geun Yeo, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/082,620

(22) Filed: Oct. 28, 2020

(65) Prior Publication Data
US 2021/0135258 A1 May 6, 2021

(30) Foreign Application Priority Data

Oct. 31, 2019 (KR) .......................... 10-2019-0137389
Dec. 12, 2019 (KR) .......................... 10-2019-0165292

(51) Int. Cl.
*H01M 8/04* (2016.01)
*H01M 8/04537* (2016.01)

(52) U.S. Cl.
CPC ... *H01M 8/04559* (2013.01); *H01M 8/04589* (2013.01); *H01M 8/04619* (2013.01)

(58) Field of Classification Search
CPC .................. H01M 8/04559; H01M 8/04589
See application file for complete search history.

(56) References Cited

U.S. PATENT DOCUMENTS

| 2017/0324106 A1* | 11/2017 | Sinha ................ H01M 8/04649 |
| 2018/0138530 A1* | 5/2018 | Tabatowski-Bush ....................... G01R 31/007 |
| 2018/0351185 A1* | 12/2018 | Kim .................. H01M 8/04559 |

FOREIGN PATENT DOCUMENTS

| JP | 2009219215 A | 9/2009 |
| KR | 100646543 B1 | 11/2006 |
| KR | 101629579 B1 | 6/2016 |

OTHER PUBLICATIONS

Korean Office Action for Korean Application No. 10-2019-0137389 dated Dec. 2, 2020 (4 pgs).

* cited by examiner

*Primary Examiner* — Olatunji A Godo
(74) *Attorney, Agent, or Firm* — Morgan, Lewis & Bockius LLP

(57) ABSTRACT

An apparatus for measuring average power of a fuel cell may include: a voltage measurement unit configured to sequentially measure forward voltages of unit cells including a fuel cell stack from a bottom cell to a top cell, and sequentially measure reverse voltages of the unit cells from the top cell to the bottom cell; a current measurement unit configured to measure a current of an output terminal of the fuel cell stack; and a control unit configured to control the voltage measurement unit to measure the reverse voltages based on a current measurement time point, after the voltage measurement unit measures the forward voltages, and calculate average power using the forward voltages, the reverse voltages and the measured current.

14 Claims, 8 Drawing Sheets

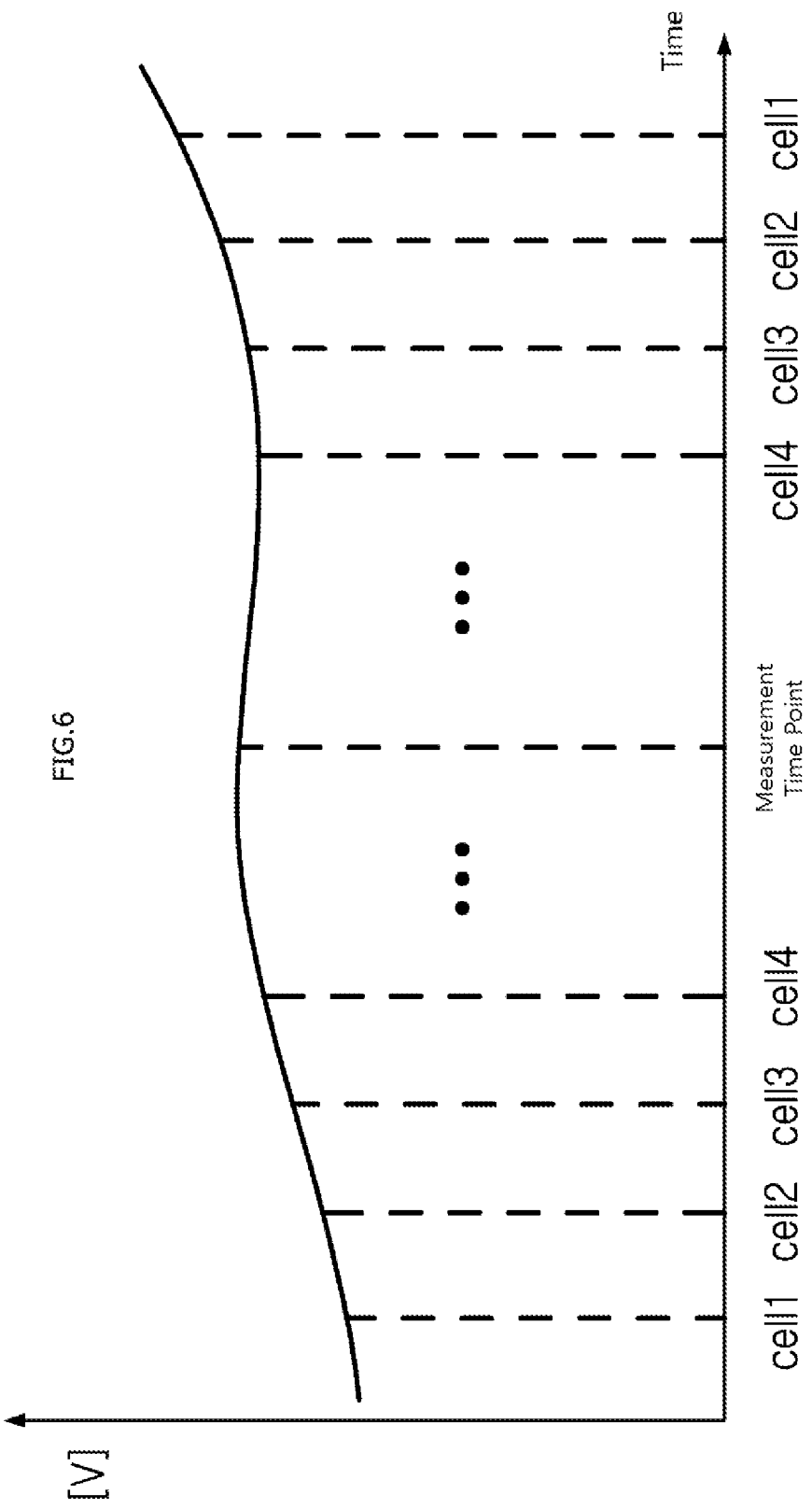

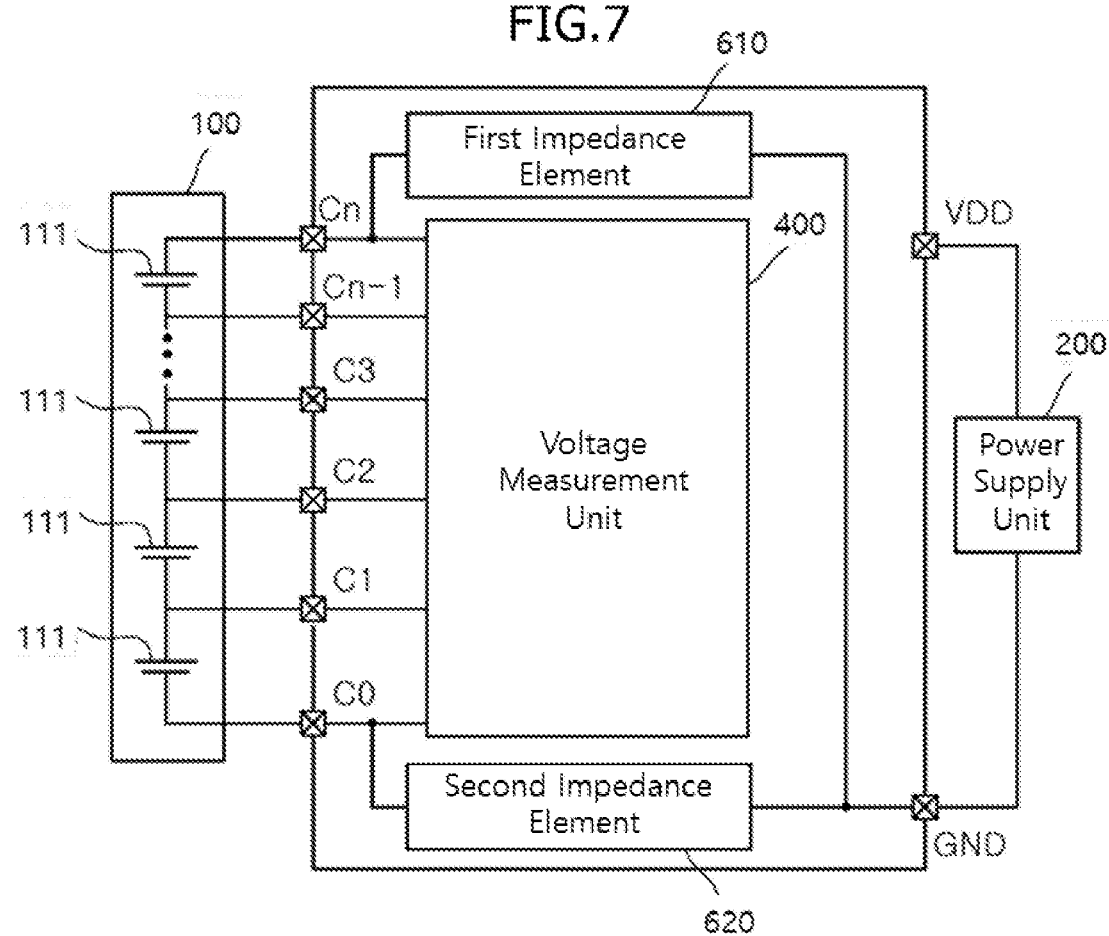

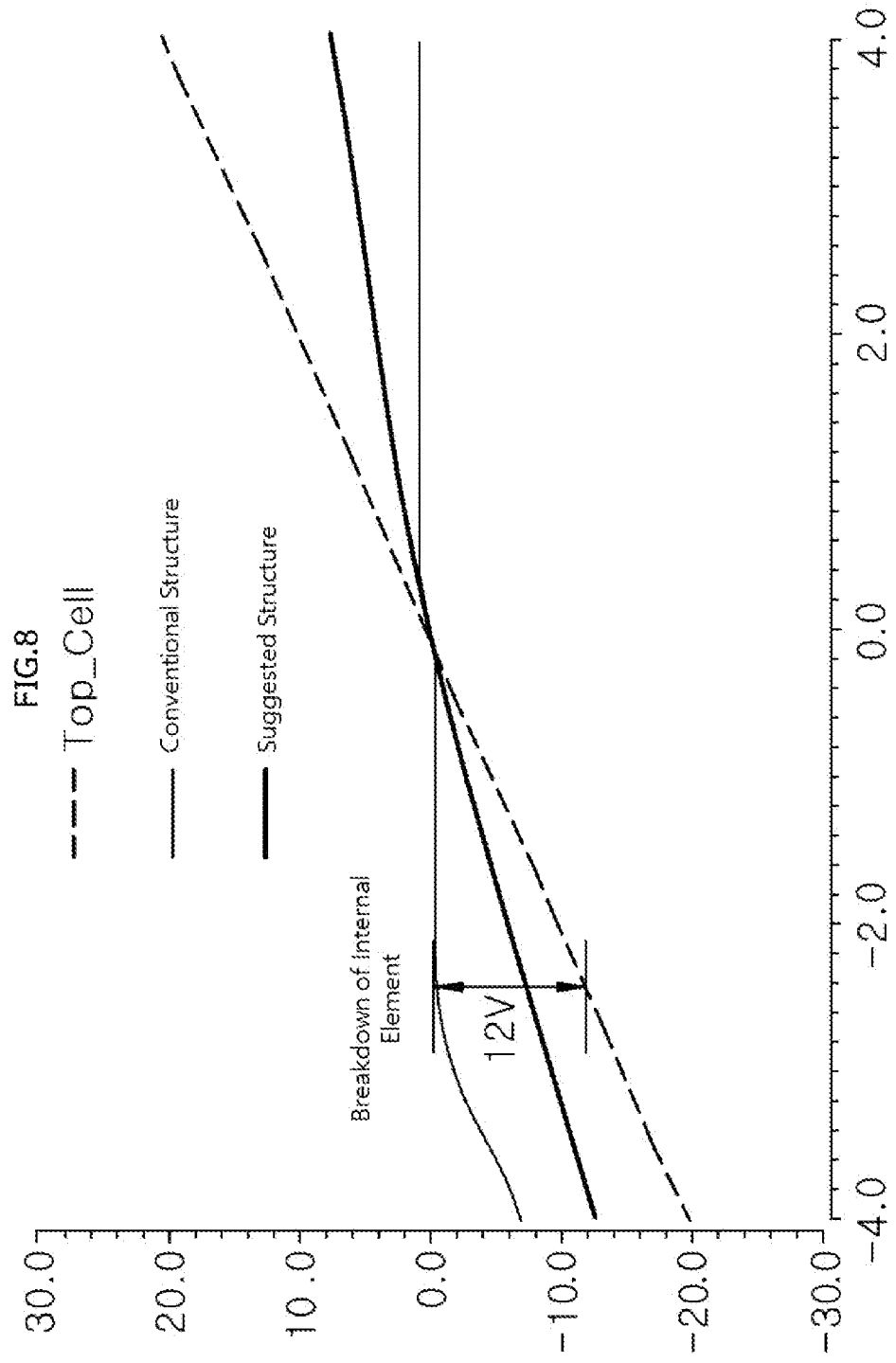

APPARATUS AND METHOD FOR MEASURING VOLTAGE AND AVERAGE POWER OF FUEL CELL

CROSS-REFERENCE TO RELATED APPLICATION

The present application claims priority to and the benefit of Korean Patent Application Nos. 10-2019-0137389 and 10-2019-0165292, filed on Oct. 31 and Dec. 12, 2019, which are hereby incorporated by reference for all purposes in its entirety.

TECHNICAL FIELD

The present disclosure relates to an apparatus and method for measuring a voltage and average power of a fuel cell.

BACKGROUND

A fuel cell is a kind of power generation device which converts chemical energy of fuel into electrical energy by electrochemically reacting the fuel within a stack, without changing the chemical energy into heat through combustion. The fuel cell may be applied to not only supply power for industrial use, power for domestic use, and power for driving a vehicle, but also supply power for a small-sized electric/electronic product or specifically a portable device.

Currently, much research is being conducted on a PEMFC (Polymer Electrolyte Membrane Fuel Cell or Proton Exchange Membrane Fuel Cell) having the highest power density among fuel cells, as a power supply source for driving a vehicle. The PEMFC has a short start-up time and a short power-conversion reaction time due to low operation temperature.

The PEMFC includes an MEA (Membrane Electrode Assembly), a GDL (Gas Diffusion Layer), a gasket and clamping mechanism, and a bipolar plate. The MEA has a catalyst electrode layer in which an electrochemical reaction occurs, and which is attached to either side of a solid polymer electrolyte membrane through which hydrogen ions migrate. The GDL serves to uniformly distribute reaction gases and transfer generated electrical energy. The gasket and clamping mechanism serve to maintain proper clamping pressure and airtightness of the reactions gases and cooling water. The bipolar plate moves the reaction gases and cooling water.

When such unit cell components are used to assemble a fuel cell stack, a combination of the MEA and the GDL, which are main components, is positioned in the innermost part of the cell. The MEA has catalyst electrode layers attached to both surfaces of the polymer electrolyte membrane, i.e. an anode and cathode, and the GDL, the gasket and the like are stacked on the outside of the MEA, where the anode and cathode are positioned. The catalyst electrode layers are coated with catalyst such that oxygen and hydrogen react with each other.

The bipolar plate is positioned outside the GDL, and has a flow field through which reaction gases including hydrogen used as fuel and oxygen or air used as an oxidizer are supplied and cooling water is passed.

With such a configuration set to a unit cell, a plurality of unit cells are stacked, and an end plate is then coupled to the outermost part of the unit cells, in order to support a current collector, an insulating plate and the stacked cells. Then, the unit cells are repeatedly stacked and clamped between the end plates, in order to construct the fuel cell stack.

In order to acquire an actual potential required by a vehicle, a necessary number of unit cells corresponding to the required potential need to be stacked to construct the stack. One unit cell generates a potential of about 1.3V, and a plurality of cells are stacked in series to generate power required for driving a vehicle. Since such a fuel cell has a significant voltage fluctuation, the voltage of the fuel cell needs to be accurately measured in order to accurately calculate the power of the fuel cell.

SUMMARY

Various embodiments are directed to an apparatus and method for measuring average power of a fuel cell, which can synchronize a voltage measurement time point and a current measurement time point of a fuel cell stack, and accurately calculate average power of the fuel cell stack through the synchronization.

Also, various embodiments are directed to an apparatus and method for measuring average power of a fuel cell, which can change a ground voltage by connecting high impedance elements between a top unit cell and a ground and between a bottom unit cell and the ground, prevent an element from being broken down by a high reverse voltage which is generated under a specific condition when a voltage of the fuel cell is measured, and measure the voltage of the fuel cell.

In an embodiment, an apparatus for measuring average power of a fuel cell may include: a voltage measurement unit configured to sequentially measure forward voltages of unit cells constituting a fuel cell stack from a bottom cell to a top cell, and sequentially measure reverse voltages of the unit cells from the top cell to the bottom cell; a current measurement unit configured to measure a current of an output terminal of the fuel cell stack; and a control unit configured to control the voltage measurement unit to measure the reverse voltages based on the current measurement time point, after the voltage measurement unit completely calculates the forward voltages, and calculate average power using the forward voltages, the reverse voltages and the measured current.

The voltage measurement unit may include: a voltage measurer configured to measure voltages of the respective unit cells; a MUX configured to sequentially output the voltages measured for the respective unit cells by the voltage measurer; and an ADC configured to convert the voltages of the respective unit cells, outputted from the MUX, into digital signals.

The voltage measurer may include: one or more voltage sensors installed to correspond one-to-one to each of the unit cells, and configured to sense the voltage of each of the unit cells; a switch configured to electrically connect the unit cell to the voltage sensor; and a replica unit configured to measure a noise voltage according to a switching operation of the switch.

The voltage measurement unit may further include an amplifier configured to subtract the noise voltage measured by the replica unit from the voltage measured by the voltage sensor.

The voltage measurement unit may further include a level shifter configured to shift the levels of the voltages of the unit cells, measured by the voltage measurer, to within an operable withstanding voltage range, and provide the resultant voltages to the MUX.

The voltage measurement unit may further include a scaler configured to down scale the voltages of the respective unit cells, measured by the voltage measurer.

The control unit may calculate an average voltage of the forward voltages and the reverse voltages, and calculate average power by multiplying the calculated average voltage by the measured current.

The control unit may compare the average power to instantaneous powers of the respective unit cells, and detect an abnormal operation of a unit cell when the comparison result for the corresponding unit cell indicates that an error equal to or more than a preset threshold value occurs.

The control unit may calculate the instantaneous powers of the respective unit cells using the voltages of the unit cells, measured by the voltage measurement unit, and the current measured by the current measurement unit.

In an embodiment, a method for measuring average power of a fuel cell may include: sequentially measuring, by a voltage measurement unit, forward voltages of unit cells constituting a fuel cell stack from a bottom cell to a top cell; measuring, by a current measurement unit, a current of an output terminal of the fuel cell stack; sequentially measuring, by the voltage measurement unit, reverse voltages of the unit cells from the top unit cell to the bottom unit cell; and calculating, by a control unit, an average voltage of the forward voltages and the reverse voltages, and calculating average power of the fuel cell stack using the calculated average voltage and the measured current.

In the calculating of the average power of the fuel cell stack, the control unit may calculate average power by multiplying the average voltage by the measured current.

The method may further include comparing, by the control unit, the average power to instantaneous powers of the respective unit cells, and detecting an abnormal operation of a unit cell when the comparison result for the corresponding unit cell indicates that an error equal to or more than a preset threshold value occurs, after the calculating of the average power of the fuel cell stack.

In an embodiment, an apparatus for measuring a voltage of a fuel cell may include: a voltage measurement unit configured to measure voltages of unit cells constituting a fuel cell stack; and a protection unit connected to one or more of the unit cells, and configured to prevent damage to the voltage measurement unit due to a reverse voltage.

The protection unit may include: a first impedance element having one end connected to a positive (+) terminal of a top unit cell among the unit cells and the other end connected to a ground of the voltage measurement unit; and a second impedance element having one end connected to a negative (−) terminal of the bottom unit cell among the unit cells and the other end connected to the ground.

The impedance of the first impedance element and the impedance of the second impedance element may be set according to a reversal-potential withstanding voltage of the voltage measurement unit.

In accordance with the embodiments of the present disclosure, the apparatus and method for measuring average power of a fuel cell may sequentially measure forward voltages from the bottom unit cell to the top unit cell of the fuel cell stack, sequentially measure reverse voltages from the top unit cell to the bottom unit cell based on the current measurement time point, and calculate the average voltage of the forward voltages and the reverse voltages, thereby obtaining the same effect as an effect obtained by measuring the voltages of all the unit cells at the current measurement time point.

Furthermore, the apparatus and method may synchronize the voltage measurement time point and the current measurement time point of the fuel cell stack, and thus accurately calculate the average power of the fuel cell stack. This may make it possible to accurately diagnose the state of the fuel cell having a large voltage fluctuation, and to take measures for the fuel cell. Thus, it is possible to prevent damage to the fuel cell.

The apparatus for measuring a voltage of a fuel cell in accordance with the embodiment of the present disclosure may change the ground voltage through the high impedance elements connected between the top unit cell and the ground and between the bottom unit cell and the ground, respectively. Thus, the apparatus may measure the voltage of the fuel cell while preventing an element from being broken down by a high reverse voltage which is generated under a specific condition when the voltage of the fuel cell is measured.

DRAWINGS

FIG. 6 is a graph for describing a voltage of a fuel cell in one form of the present disclosure.

FIG. 7 is a block diagram illustrating an apparatus for measuring a voltage of a fuel cell in one form of the present disclosure.

FIG. 8 is a graph illustrating a ground voltage in one form of the present disclosure.

DETAILED DESCRIPTION

Hereinafter, an apparatus and method for measuring a voltage and average power of a fuel cell will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the present disclosure into account and can be changed according to the custom or intention of users or operators. Therefore, definition of the terms should be made according to the overall disclosures set forth herein.

Conventionally, the voltages of all the unit cells of the fuel cell stack are sequentially measured, and a current is measured for the last time. In other words, the voltage measurement time points are different from the current measurement time point, which makes it impossible to accurately calculate power. Such differences may make it difficult to accurately diagnose a state of the fuel cell having a large voltage fluctuation, and to take a measure for the state. In this case, the fuel cell may be damaged.

Conventionally, the voltages of a ground and a bottom cell of a sensing semiconductor are measured together, in order to measure the voltage of the fuel cell. When a difference between the voltages exceeds a reverse voltage limit (generally, −10V to −20V) of an internal semiconductor element under a special condition, the sensing semiconductor may be burned out.

Embodiment 1

Figure 1:
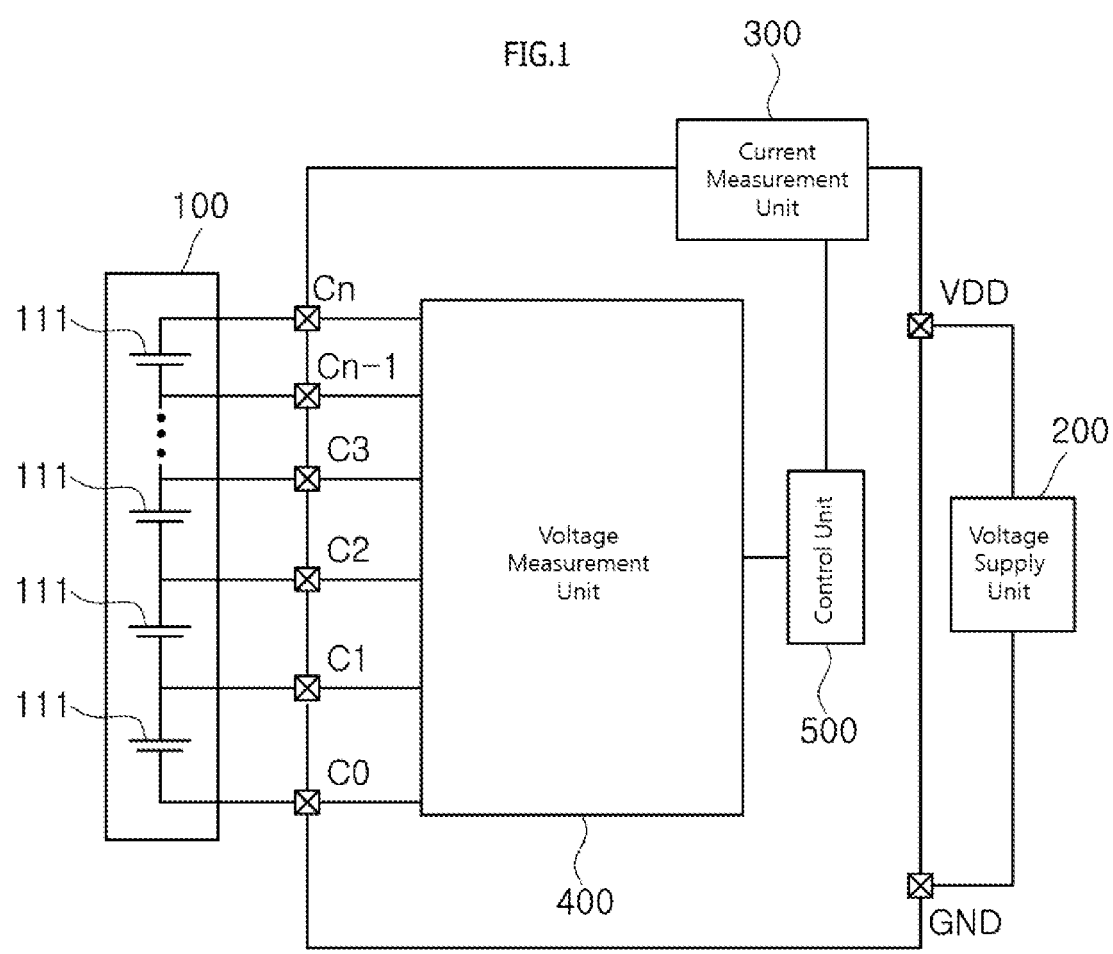
FIG. 1 is a block diagram illustrating an apparatus for measuring average power of a fuel cell in one form of the present disclosure.

FIG. 1 is a block diagram illustrating an apparatus for measuring average power of a fuel cell in some forms of the present disclosure.

Referring to FIG. 1, the apparatus for measuring average power of a fuel cell in accordance with the embodiment of the present disclosure includes a fuel cell stack 100, a power supply unit 200, a current measurement unit 300, a voltage measurement unit 400 and a control unit 500. The apparatus for measuring average power of a fuel cell, illustrated in FIG. 1, is based on an embodiment. Thus, the components of the apparatus are not limited to the embodiment illustrated in FIG. 1, and some of the components may be added, modified or removed, if necessary.

The fuel cell stack 100 includes a plurality of unit cells 111 which are sequentially arranged. The fuel cell stack 100 may generate a signal current, and the current measurement unit 300 may measure a current of the fuel cell stack 100 by analyzing the signal current applied from the fuel cell stack 100.

The power supply unit 200 supplies power required for an operation of the voltage measurement unit 400. The power supply unit 200 floats the ground, and supplies the floated voltage.

The current measurement unit 300 measures a current of an output terminal of the fuel cell stack 100, and transmits the measured current to the control unit 500.

The voltage measurement unit 400 sequentially measures forward voltages of the unit cells 111 constituting the fuel cell stack 100 from the bottom unit cell to the top unit cell, and sequentially measures reverse voltages of the unit cells 111 from the top unit cell to the bottom unit cell. At this time, the voltage measurement unit 400 may measure a reverse voltage based on a current measurement time point, and the current measurement time point may indicate a point of time that the current measurement unit 300 measures a current.

The voltage measurement unit 400 transmits the measured forward voltages and reverse voltages to the control unit 500.

As described above, the voltage measurement unit 400 may not measure the voltages of all the unit cells 111 constituting the fuel cell stack 100 only once, but measure the voltages of the unit cells 111 again in reverse order of the voltages of the unit cells 111, which are previously measured, based on the current measurement time point. When the voltages are measured again in reverse order after the voltages are measured from the bottom unit cell, the voltage measurement time points may be synchronized. That is, although the voltages of the unit cells 111 are measured at different times, the voltages of all the unit cells 111 may be measured twice to calculate an average voltage, which makes it possible to obtain the same effect as an effect obtained by measuring all the cell voltages at a specific point of time (for example, the current measurement time point).

The voltage measurement unit 400 will be described in detail with reference to FIG. 2.

When the voltage measurement unit 400 completely measures the forward voltages, the control unit 500 controls the voltage measurement unit 400 to measure the reverse voltages based on the current measurement time point, and calculates average power using the forward voltages, the reverse voltages and the current measured by the current measurement unit 300. At this time, the control unit 500 may calculate the average voltage of the forward voltages and the reverse voltages, and calculate the average power by multiplying the calculated average voltage by the measured current. That is, the control unit 500 may calculate the average power of the fuel cell stack 100 using Equation 1 below.

$$\text{Average Power} = \text{Measurement Time Point Current} * \text{Average Voltage} \quad \text{[Equation 1]}$$

In Equation 1, the measurement time point may have the same meaning as the current measurement time point, and indicate a point of time that the current measurement unit 300 measures a current, and the measurement time point current may indicate a current measured by the current measurement unit 300 at the measurement time point.

The control unit 500 compares the average power to instantaneous powers of the respective unit cells, and detects an abnormal operation of a unit cell when the comparison result for the corresponding unit cell indicates that an error equal to or more than a preset threshold value occurs. At this time, the control unit 500 may calculate the instantaneous power of each unit cell using the voltage of the unit cell, measured by the voltage measurement unit 400, and the current measured by the current measurement unit 300.

The average power may guarantee power measurement accuracy when a significant voltage fluctuation occurs. On the other hand, the instantaneous power may reduce the power measurement accuracy due to a measurement time point error, when the voltage fluctuation occurs. Thus, the control unit 500 may compare the average power and the instantaneous powers in real time. When an error equal to or more than the threshold value occurs in a specific interval, the control unit 500 may detect an instantaneous abnormal operation of the fuel cell.

The control unit 500 may be implemented as an MCU (Micro Control Unit), and calculates the average power of the fuel cell stack 100 using the forward voltages and reverse voltages provided from the voltage measurement unit 400 and the current provided from the current measurement unit 300.

Although the apparatus for measuring average power of a fuel cell in accordance with the embodiment of the present disclosure measures the voltages of the unit cells 111 at different times, the apparatus may calculate the average voltage by measuring the voltages of all the unit cells 111 twice, thereby obtaining the same effect as an effect obtained by measuring the cell voltages at a specific point of time (for example, the current measurement time point). Therefore, the apparatus can improve the accuracy of the average power by synchronizing the voltage measurement time points of the fuel cell.

Figure 2:
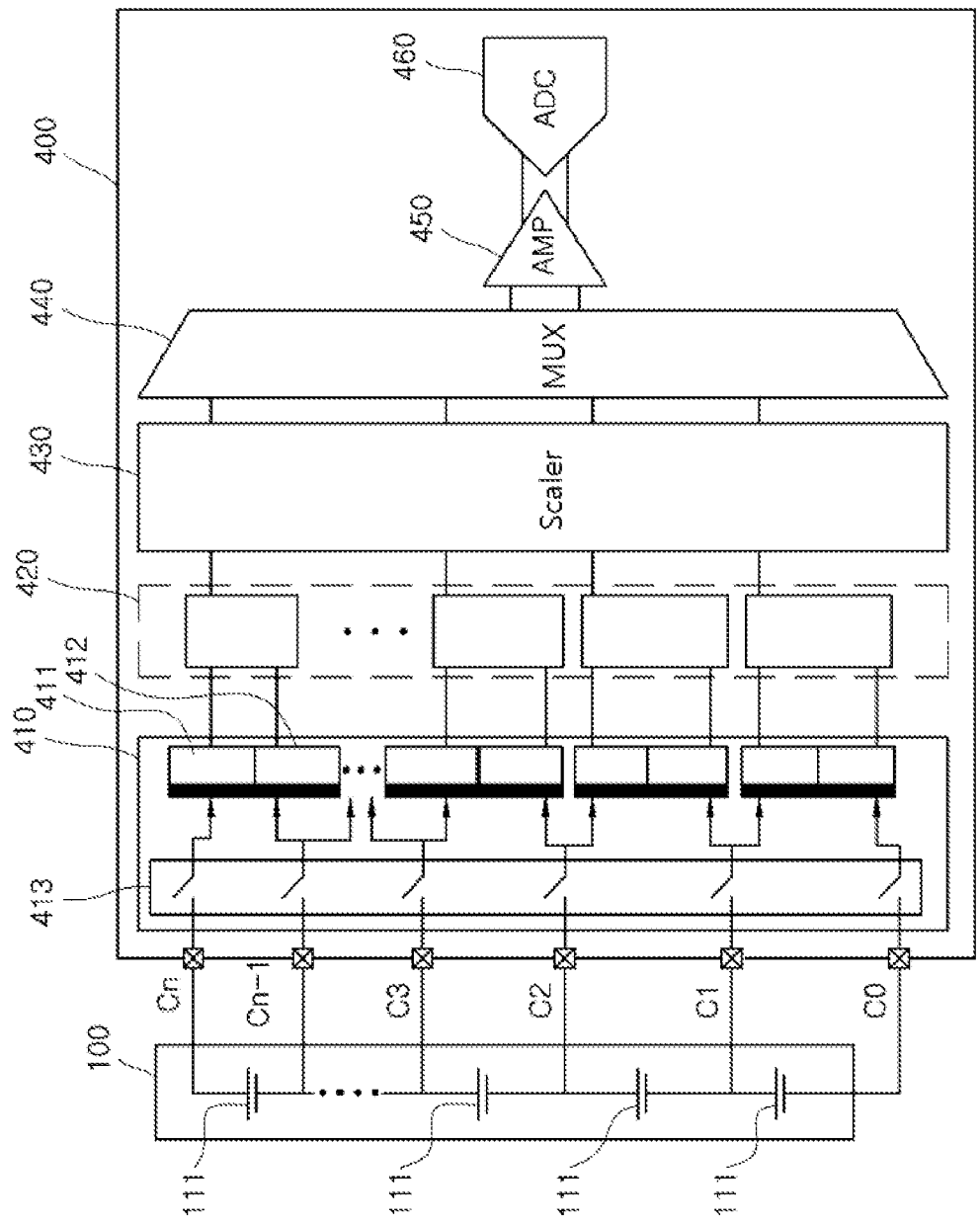
FIG. 2 is a block diagram illustrating a voltage measurement unit in one form of the present disclosure.

FIG. 2 is a block diagram illustrating the voltage measurement unit in some forms of the present disclosure.

Referring to FIG. 2, the voltage measurement unit 400 in accordance with the embodiment of the present disclosure includes a voltage measurer 410, a level shifter 420, a scaler 430, a multiplexer (MUX) 440, an amplifier 450 and an ADC (Analog Digital Converter) 460.

The voltage measurer 410 measures the voltage of each unit cell 111.

The voltage measurer 410 includes a plurality of voltage sensors 411, a plurality of replica units 412 and a plurality of switches 413.

One ends of the switches 413 are connected between the respective unit cells 111 through connection pins C0 to Cn, and the other ends of the switches 413 are connected to the voltage sensors 411 which will be described below, and electrically connect the unit cells 111, which are measurement targets, to the voltage sensors 411 for measuring the voltages of the corresponding unit cells 111.

Two switches 413 are connected to one voltage sensor 411 so as to be electrically connected to each of the voltage sensors 411. In this case, the switches 413 are commonly connected to the voltage sensor 411 adjacent thereto.

For example, the switches 413 connected to the connection pin C1 may be commonly connected to the voltage sensor 411 for measuring the voltage of the bottom unit cell 111 and the voltage sensor 411 for measuring the voltage of an upper unit cell of the bottom unit cell 111, and all turned on when the voltage of the upper unit cell of the bottom unit cell 111 as well as the voltage of the bottom unit cell are measured.

That is, when the voltage of the bottom unit cell is to be measured, the switches 413 connected to two connection pins C0 and C1 are turned on. At this time, the voltage sensor 411 connected to the corresponding switches 413 measures the voltage of the corresponding bottom unit cell.

Furthermore, when the voltage of the upper unit cell 111 of the bottom unit cell is to be measured, the switches 413 connected to the connection pins C1 and C2 are turned on. At this time, the voltage sensor 411 connected to the corresponding switches 413 measures the voltage of the upper unit cell 111 of the corresponding bottom unit cell.

The voltage sensors 411 are installed to correspond one-to-one to the respective unit cells 111, and sense the voltages of the unit cells 111. The voltage sensor 411 may include a capacitor (not illustrated) therein, and measure the voltage of power stored in the corresponding capacitor when the corresponding switch 413 is turned on.

The method in which the voltage sensor 411 senses the voltage of the unit cell 111 is not specifically limited, and may include any methods as long as the methods can sense the voltage of the unit cell 111.

The replica unit 412 measures a noise voltage according to a switching operation of the switch 413. The replica unit 412 may have the same structure as the above-described voltage sensor 411. For example, during the switching operation of the switch 413, a noise voltage may be generated according to the switching operation. As a result, the replica unit 412 may sense a noise voltage of 0.1V even though a voltage of 5V is sensed by the voltage sensor 411.

The amplifier 450 subtracts the noise voltage measured by the replica unit 412 from the voltage measured by the voltage sensor 411, and outputs the resultant voltage as the actual voltage of the unit cell 111, thereby minimizing a voltage error. The amplifier 450 may be installed in the voltage measurer 410. In addition, however, the amplifier 450 may also be installed at the rear of the scaler 430 or the MUX 440 which will be described below.

Figure 3:
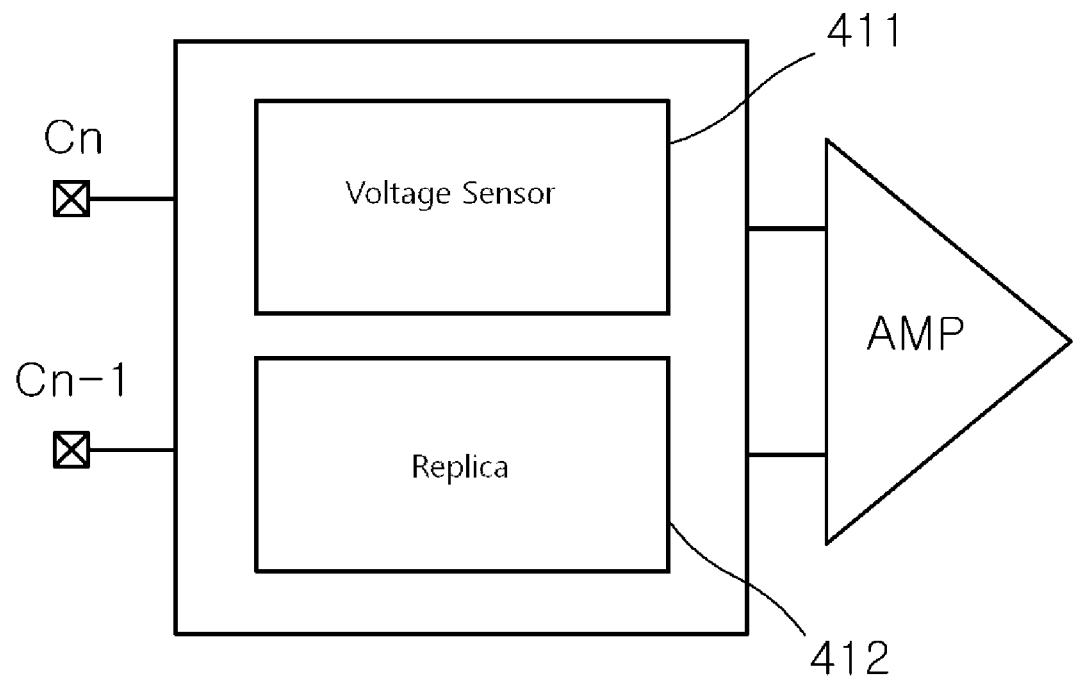
FIG. 3 is a diagram illustrating another example of a voltage measurer in one form of the present disclosure.

That is, the amplifier 450 may be installed at the rear of the MUX 440 as illustrated in FIG. 2, or installed at the rear of the voltage sensor 411 and the replica unit 412 in the voltage measurer 410 as illustrated in FIG. 3.

In the present embodiment, the scaler 430 or the MUX 440 may be omitted. In this case, the amplifier 450 may be installed at the rear of the voltage sensor 411 and the replica unit 412 in the voltage measurer 410.

On the other hand, when the scaler 430 and the MUX 440 are installed, the amplifier 450 may be installed at the rear of the MUX 440 or the scaler 430.

The amplifier 450 may be installed at various positions according to whether the scaler 430 and the MUX 440 are installed.

The level shifter 420 lowers the voltages of the respective unit cells 111 to within an operable withstanding voltage range. Typically, the voltages of the unit cells 111 are equal to or higher than 100V. Since the voltages of the unit cells 111 are not suitable for an operation of the amplifier 450 or the ADC 460 which will be described below, the level shifter 420 shifts the level of the voltage of the unit cell 111 to a level at which the amplifier 450 or the ADC 460 can normally operate. Furthermore, the level shifter 420 inputs the voltage measured by the voltage sensor 411 to the scaler 430 such that the scaler 430 or the MUX 440 can normally operate.

The scaler 430 scales the voltage sensed by the voltage sensor 411 to a voltage which can be received by the MUX 440, the amplifier 450 or the ADC 460 installed at the rear thereof.

Typically, the MUX 440, the amplifier 450 or the ADC 460 is a low voltage element which can receive a relatively low voltage. Thus, as described above, the scaler 430 may scale the voltage sensed by the voltage sensor 411 to a voltage which can be received by the MUX 440, the amplifier 450 or the ADC 460 installed at the rear thereof, such that the MUX 440, the amplifier 450 or the ADC 460 can normally operate.

The MUX 440 sequentially outputs the voltages of the respective unit cells 111, inputted from the scaler 430.

In the present embodiment, it has been described that the MUX 440 is installed at the rear of the scaler 430. However, the scope of the present disclosure is not limited thereto, and the MUX 440 may be installed at the rear of the level shifter 420. In this case, the scaler 430 does not need to be separately provided.

As described above, the amplifier 450 may be installed in the voltage measurement unit 400. However, the amplifier 450 may be installed at the rear of the MUX 440.

The ADC 460 is installed at the rear of the amplifier 450, and converts the voltage of each unit cell 111, outputted from the amplifier 450, into a digital signal.

Figure 4:
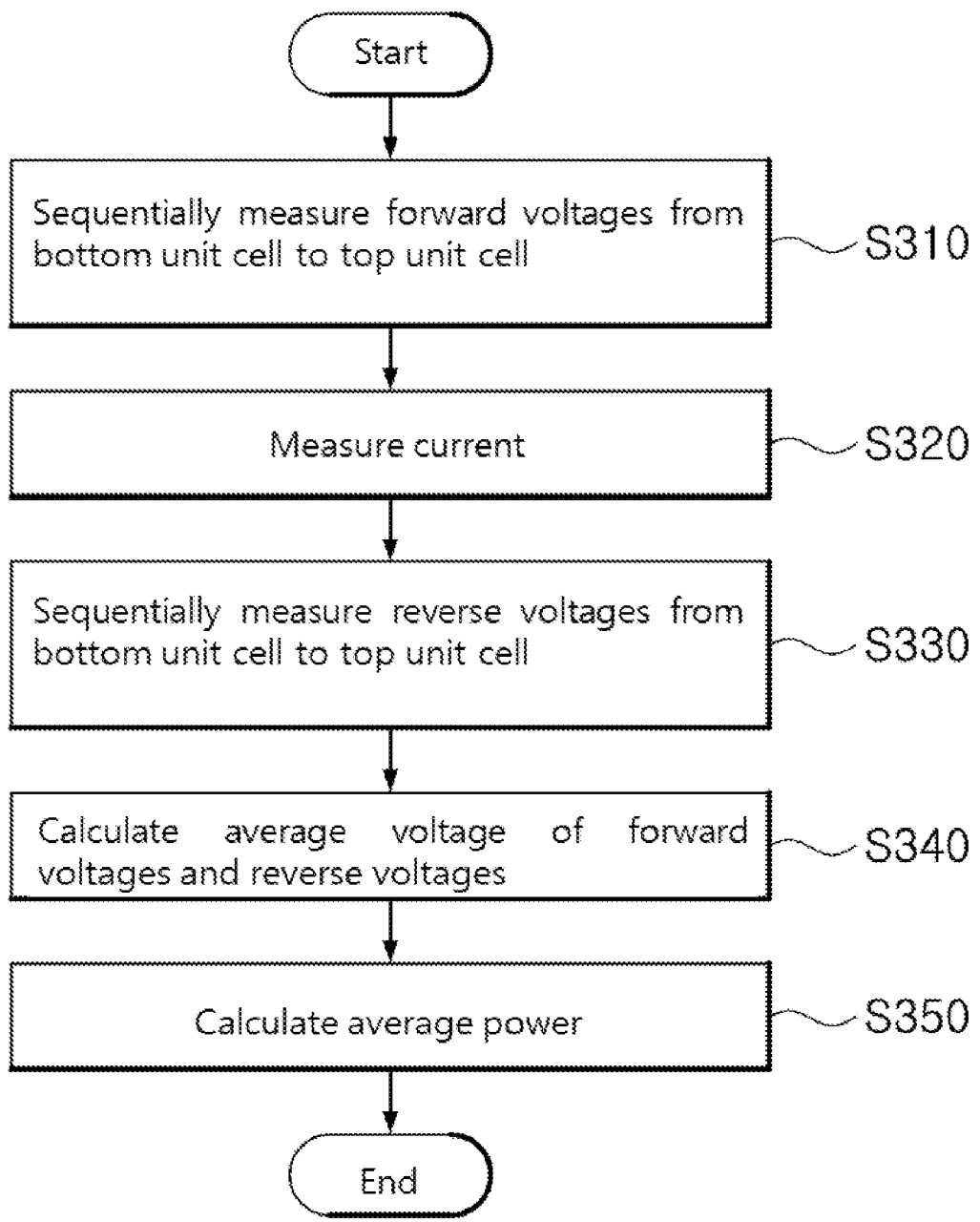
FIG. 4 is a flowchart illustrating a method for measuring average power of a fuel cell in one form of the present disclosure.
Figure 5:
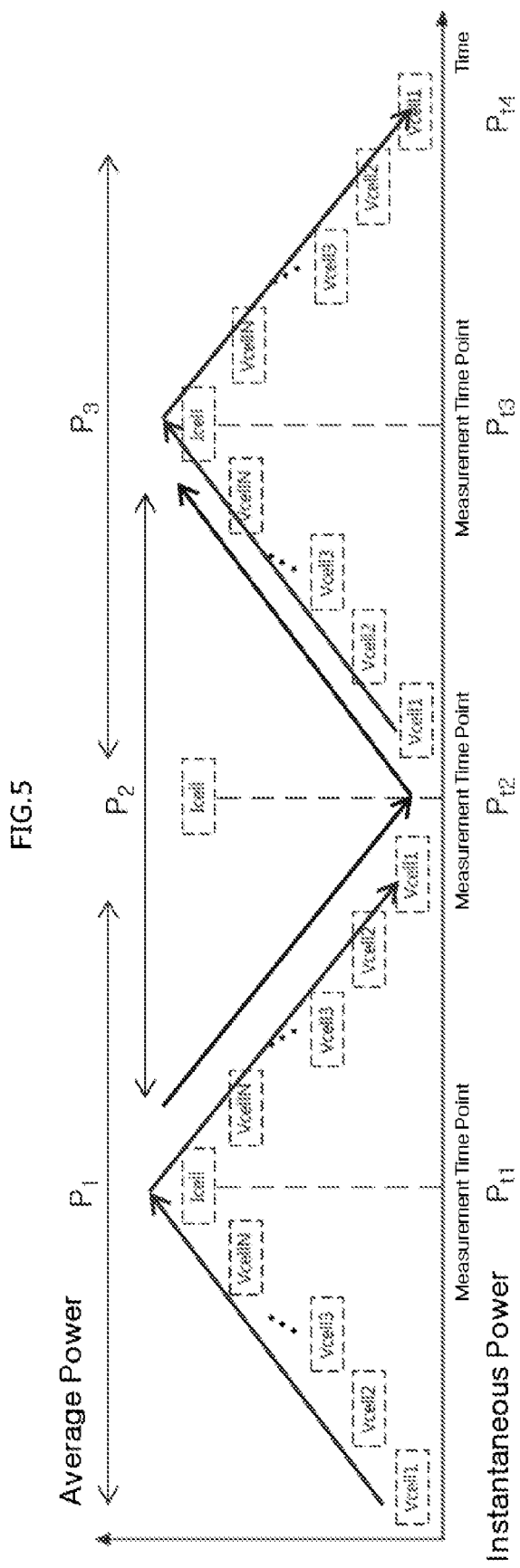
FIG. 5 is a graph for describing a voltage measurement time point and a current measurement time point of the fuel cell in one form of the present disclosure.

FIG. 4 is a flowchart illustrating a method for measuring average power of a fuel cell in some forms of the present disclosure, FIG. 5 is a graph for describing voltage measurement time points and a current measurement time point of the fuel cell in some forms of the present disclosure, and FIG. 6 is a graph for describing a voltage of the fuel cell in some forms of the present disclosure.

Referring to FIG. 4, the voltage measurement unit 400 sequentially measures forward voltages of the unit cells 111 constituting the fuel cell stack 100 from the bottom unit cell to the top unit cell, in step S310. For example, the voltage measurement unit 400 may sequentially measure the voltages of the unit cells from the unit cell cell1 to the unit cell cellN, as indicated by A in FIG. 5.

When step S310 is performed, the current measurement unit 300 measures a current of the output terminal of the fuel cell stack 100, in step S320. For example, as illustrated in FIG. 5, the current measurement unit 300 may measure the current of the fuel cell stack 100 at a current measurement time point B.

When step S320 is performed, the voltage measurement unit 400 sequentially measures reverse voltages from the top unit cell to the bottom unit cell in step S330. For example, the voltage measurement unit 400 may sequentially measure the voltages of the unit cells from the unit cell cell1 to the unit cell cellN, as indicated by C in FIG. 5.

When step S330 is performed, the control unit 500 calculates the average voltage of the forward voltages and the reverse voltages in step S340. For example, the control unit 500 may calculate the average voltage of the forward voltages of the unit cells from the unit cell cell1 to the unit cell cellN and the reverse voltages of the unit cells from the unit cell cell1 to the unit cell cellN. When the average voltage of the forward voltages and the reverse voltages is calculated, the point of time that the average voltage is calculated is synchronized with the point of time that the current is measured, as illustrated in FIG. 6. Thus, it is possible to obtain the same effect as an effect obtained by measuring all cell voltages at the measurement time point (for example, the current measurement time point).

When step S340 is performed, the control unit 500 calculates the average power of the fuel cell stack 100 using the calculated average voltage and the measured current, in step S350. At this time, the control unit 500 may calculate the average power by multiplying the calculated average voltage by the measured current.

As such, it is possible to calculate the average power by synchronizing the voltage measurement time points, thereby improving the accuracy of the average power.

After step S350, the control unit 500 may compare the average power to instantaneous powers of the respective unit cells, and detect an abnormal operation of a unit cell when the comparison result for the comparison result indicates that an error equal to or more than a preset threshold value occurs. At this time, the control unit 500 may calculate the instantaneous power of each unit cell using the voltage of the unit cell, measured by the voltage measurement unit 400, and the current measured by the current measurement unit 300.

In the above, only a method for calculating average power P1 has been described with reference to FIG. 5. However, while step S330 is performed, the voltage measurement unit 400 may sequentially measure the reverse voltages of the unit cells from the unit cell cellN to the unit cell cell1, as illustrated by D of FIG. 5. Then, the voltage measurement unit 400 may measure a current of the fuel cell stack 100 at a current measurement time point E, and measure the forward voltages of the unit cells from the unit cell cell1 to the unit cell cellN, as indicated by F of FIG. 5. Then, the control unit 500 may calculate average power P2 using the reverse voltages of the unit cells from the unit cell cellN to the unit cell cell1 and the forward voltages of the unit cells from the unit cell cell1 to the unit cell cellN.

The apparatus for measuring average power of a fuel cell may calculate the average power P1 by sequentially measuring the forward voltages and the reverse voltages of the unit cells 111, and calculate the average power P2 by sequentially measuring the reverse voltages and the forward voltages of the unit cells 111. As such, the apparatus may calculate the average power by measuring the voltages of the unit cells 111 in each half period.

The apparatus and method for measuring average power of a fuel cell in accordance with the embodiment of the present disclosure may sequentially measure the forward voltages of the unit cells of the fuel cell stack 100 from the bottom unit cell to the top unit cell, sequentially measure the reverse voltages of the unit cells from the top unit cell to the bottom unit cell based on the current measurement time point, and then calculate the average voltage of the forward voltages and the reverse voltages, thereby obtaining the same effect as an effect obtained by measuring all the cell voltages at the current measurement time point.

Furthermore, the apparatus and method may synchronize the voltage measurement time point and the current measurement time point of the fuel cell stack 100, and thus accurately calculate the average power of the fuel cell stack 100. This may make it possible to accurately diagnose the state of the fuel cell having a large voltage fluctuation, and to take measures for the fuel cell. Thus, it is possible to prevent damage to the fuel cell.

Embodiment 2

FIG. 7 is a block diagram illustrating an apparatus for measuring a voltage of a fuel cell in some forms of the present disclosure, and FIG. 8 is a graph illustrating a ground voltage in some forms of the present disclosure.

Referring to FIG. 7, the apparatus for measuring a voltage of a fuel cell in accordance with the embodiment of the present disclosure includes a fuel cell stack 100, a power supply unit 200, a voltage measurement unit 400 and a protection unit 600. The fuel cell stack 100, the power supply unit 200 and the voltage measurement unit 400 in accordance with the second embodiment correspond to the same components as those of the first embodiment, and the following descriptions will be focused on the function and operation of the protection unit 600.

The protection unit 600 includes a first impedance element 610 and a second impedance element 620.

The protection unit 600 is connected to one or more of unit cells 111 of the fuel cell stack 100. The protection unit 600 prevents damage to the internal elements of the voltage measurement unit 400, which is caused by a reverse voltage generated under a specific condition.

The first impedance element 610 has one end connected to a positive (+) terminal of the top unit cell among the unit cells 111 and the other end connected to a ground GND of the voltage measurement unit 400.

The second impedance element 620 has one end connected to a negative (−) terminal of the bottom unit cell among the unit cells 111 and the other end connected to the ground GND of the voltage measurement unit 400.

Each of the impedance of the first impedance element 610 and the impedance of the second impedance element 620 may be variably set according to a reversal-potential withstanding voltage of the voltage measurement unit 400.

As described above, the first impedance element 610 has one end connected to the positive (+) terminal of the top unit cell and the other end connected to the ground of the voltage measurement unit 400, and the second impedance element 620 has one end connected to the negative (−) terminal of the bottom unit cell and the other end connected to the ground of the voltage measurement unit 400. Thus, the ground voltage is varied.

Thus, when the voltage measurement unit 400 measures the voltage of the unit cell 111, the ground voltage may be varied even though a relatively high reverse voltage is generated, which makes it possible to prevent the internal elements of the voltage measurement unit 400 from being burned by the reversal-potential withstanding voltage.

Referring to FIG. 8, a conventional apparatus for measuring a voltage of a fuel cell has a fixed ground voltage. Thus, when a voltage difference between the ground voltage and the voltage of the top unit cell Top_Cell becomes equal to or higher than −12V (corresponding to the voltage level of a general semiconductor element), internal elements may be broken down.

In the embodiment of the present disclosure, however, the first and second impedance elements 610 and 620 each having relatively high impedance are connected to vary the ground voltage. Thus, a voltage difference at which the internal elements of the voltage measurement unit 400 are broken down does not occur. Therefore, the internal elements of the voltage measurement unit 400 are safely protected.

As described above, the first impedance element 610 has one end connected to the positive (+) terminal of the top unit cell and the other end connected to the ground of the voltage measurement unit 400, the second impedance element 620 has one end connected to the negative (−) terminal of the bottom unit cell and the other end connected to the ground of the voltage measurement unit 400, and the first and second impedance elements 610 and 620 are designed to each have high impedance corresponding to such a level that can prevent a breakdown of an internal element of the voltage measurement unit 400. Therefore, no current flows through the first and second impedance elements 610 and 620. Therefore, it is impossible to measure a voltage through the existing current measurement method.

Thus, the voltage measurement unit 400 directly measures the voltages of the unit cells 111 constituting the fuel cell stack 100 through the voltage measurement method, not the current measurement method. The sub components of the voltage measurement unit 400 may be configured as those of the first embodiment, and the operation of the voltage measurement unit 400 may be performed in the same manner as in the first embodiment.

As described above, the apparatus for measuring a voltage of a fuel cell in accordance with the embodiment of the present disclosure may change the ground voltage through the high impedance elements connected between the top unit cell and the ground and between the bottom unit cell and the ground, respectively. Thus, the apparatus may measure the voltage of the fuel cell while preventing an element from being broken down by a high reverse voltage which is generated under a specific condition when the voltage of the fuel cell is measured.

So far, the first and second embodiments have been separately described. However, the protection unit 600 of the second embodiment may be applied to the circuit configuration of the first embodiment, in order to perform the function of prevent damage to the voltage measurement unit 400 in accordance with the first embodiment.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor includes a communication device, such as a computer, a cell phone, a PDA (Personal Digital Assistant) and another device, which can facilitate information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for measuring an average power of a fuel cell, comprising:
   a voltage measurement unit configured to:
      sequentially measure forward voltages of unit cells included in a fuel cell stack from a bottom cell to a top cell; and
      sequentially measure reverse voltages of the unit cells from the top cell to the bottom cell;
   a current measurement unit configured to measure a current of an output terminal of the fuel cell stack; and
   a control unit configured to:
      control the voltage measurement unit to measure the reverse voltages based on a current measurement time point; and
      after the forward voltages are measured, calculate the average power based on the forward voltages, the reverse voltages and the measured current.

2. The apparatus of claim 1, wherein the voltage measurement unit comprises:
   a voltage measurer configured to measure voltages of the unit cells;
   a multiplexer (MUX) configured to sequentially output the measured voltages; and
   an analog-to-digital converter (ADC) configured to convert the measured voltages outputted from the MUX into digital signals.

3. The apparatus of claim 2, wherein the voltage measurer comprises:
   at least one voltage sensor corresponding to each of the unit cells and configured to sense the voltage of each of the unit cells;
   a switch configured to electrically connect the unit cell to the voltage sensor; and
   a replica unit configured to measure a noise voltage according to a switching operation of the switch.

4. The apparatus of claim 3, wherein the voltage measurement unit further comprises:
   an amplifier configured to subtract the noise voltage measured by the replica unit from the voltage measured by the voltage sensor.

5. The apparatus of claim 2, wherein the voltage measurement unit further comprises:
   a level shifter configured to:
      shift levels of the voltages of the unit cells to an operable withstanding voltage range; and
      provide resultant voltages to the MUX.

6. The apparatus of claim 2, wherein the voltage measurement unit further comprises:
   a scaler configured to down scale the voltages of the unit cells.

7. The apparatus of claim 1, wherein the control unit is configured to:
   calculate an average voltage of the forward voltages and the reverse voltages; and
   calculate the average power by multiplying the calculated average voltage by the measured current.

8. The apparatus of claim 1, wherein the control unit is configured to:
   compare the average power to instantaneous powers of the unit cells; and
   detect an abnormal operation of a unit cell when the unit cell indicates that an error equal to or greater than a preset threshold value occurs.

9. The apparatus of claim 8, wherein the control unit is configured to:
calculate the instantaneous powers of the unit cells based on the voltages of the unit cells and the measured current.

10. A method for measuring an average power of a fuel cell, comprising:
sequentially measuring, by a voltage measurement unit, forward voltages of unit cells included in a fuel cell stack from a bottom cell to a top cell;
measuring, by a current measurement unit, a current of an output terminal of the fuel cell stack;
sequentially measuring, by the voltage measurement unit, reverse voltages of the unit cells from the top cell to the bottom cell;
calculating, by a control unit, an average voltage of the forward voltages and the reverse voltages; and
calculating, by the control unit, the average power based on the calculated average voltage and the measured current.

11. The method of claim 10, wherein calculating the average power comprises:
calculating, by the control unit, the average power by multiplying the average voltage by the measured current.

12. The method of claim 10, wherein the method further comprises:
comparing, by the control unit, the average power to instantaneous powers of the unit cells; and
detecting an abnormal operation of a unit cell when the unit cell indicates that an error equal to or greater than a preset threshold value occurs after the average power is calculated.

13. An apparatus for measuring a voltage of a fuel cell, comprising:
a voltage measurement unit configured to measure voltages of unit cells including a fuel cell stack; and
a protection unit connected to at least one unit cell of the unit cells, and configured to prevent damage to the voltage measurement unit due to a reverse voltage,
wherein the protection unit comprises:
a first impedance element having a first end connected to a positive (+) terminal of a top unit cell and a second end; and
a second impedance element having a first end connected to a negative (−) terminal of the bottom unit cell and a second end,
each of the second end of the first impedance element and the second end of the second impedance element is connected to a variable ground voltage provided by voltage measurement unit.

14. The apparatus of claim 13, wherein the protection unit is configured to:
set impedance of the first impedance element and impedance of the second impedance element according to a reversal-potential withstanding voltage of the voltage measurement unit.

* * * * *